United States Patent
Bitra et al.

(10) Patent No.: US 10,645,647 B2
(45) Date of Patent: May 5, 2020

(54) EXPLOITING DRX/CDRX PARAMETERS TO CONSERVE POWER DURING AN OBSERVED TIME DIFFERENCE OF ARRIVAL (OTDOA) SESSION

(71) Applicant: QUALCOMM Incorporated, San Diego, CA (US)

(72) Inventors: Suresh Kumar Bitra, Mangalagiri (IN); Naveen Kumar Aravapalli, Hyderabad (IN); Prudhvi Kothapalli, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 180 days.

(21) Appl. No.: 15/960,531

(22) Filed: Apr. 23, 2018

(65) Prior Publication Data

US 2019/0327673 A1 Oct. 24, 2019

(51) Int. Cl.
*H04W 52/02* (2009.01)
*H04W 76/28* (2018.01)
(Continued)

(52) U.S. Cl.
CPC ........... *H04W 52/0209* (2013.01); *G01S 5/10* (2013.01); *H04L 5/0048* (2013.01); *H04W 64/00* (2013.01); *H04W 76/28* (2018.02)

(58) Field of Classification Search
CPC ... H04L 5/0048; H04L 5/0007; H04L 5/0044; H04L 5/0064; H04L 5/14; H04L 5/1469;
(Continued)

(56) References Cited

U.S. PATENT DOCUMENTS 8,406,790 B2 3/2013 Kazmi et al.
9,119,036 B2 8/2015 Kazmi et al.
(Continued)

FOREIGN PATENT DOCUMENTS

WO WO-2012112104 A1 * 8/2012 .......... H04W 64/006

OTHER PUBLICATIONS

Ericsson: "Positioning for NB-IoT", 3GPP TSG-RAN2 Meeting #96, 3GPP Draft; R2-168329 Positioning for NB-IOT, 3rd Generation Partnership Project (3GPP), Mobile Competence Centre, 650, Route Des Lucioles ; F-06921 Sophia-Antipolis Cedex, France, vol. RAN WG2, No. Reno, US; Nov. 14, 2016-Nov. 18, 2016, Nov. 13, 2016 (Nov. 13, 2016), pp. 1-6, XP051177968, Retrieved from the Internet: URL:http://www.3gpp.org/ftp/Meetings_3GPP_SYNC/RAN2/Docs/ [retrieved on Nov. 13, 2016], pp. 3-6.
(Continued)

*Primary Examiner* — Natasha W Cosme
(74) *Attorney, Agent, or Firm* — MG-IP Law, P.C.

(57) ABSTRACT

Disclosed aspects and embodiments pertain to conserving power usage during an Observed Time Difference of Arrival (OTDOA) measurement session. For example, a server or other network entity may receive information related to a Discontinuous Reception (DRx) or Connected Mode DRx (CDRx) configuration associated with a user equipment (UE) and provide, to the UE, information related to one or more base stations having Positioning Reference Signal (PRS) occasions that coincide with an OFF state associated with the DRx/CDRx configuration. Alternatively and/or additionally, the UE may receive OTDOA assistance information indicating when certain PRS occasions occur and a serving base station or other network entity may provide the UE with a DRx/CDRx configuration having an OFF state that coincides with the PRS occasions. As such, the DRx/CDRx parameters may be exploited to substantially reduce
(Continued)

or eliminate measurement gaps and conserve power usage during an OTDOA session.

30 Claims, 8 Drawing Sheets

(51) Int. Cl.
*G01S 5/10* (2006.01)
*H04L 5/00* (2006.01)
*H04W 64/00* (2009.01)

(58) Field of Classification Search
CPC ....... H04L 5/16; H04L 1/0026; H04L 1/0061; H04L 1/0071; H04L 1/0072; H04L 1/08; H04L 1/1614; H04L 1/1887; H04L 5/0016; H04L 5/0026; H04L 5/0028; H04L 5/0037; H04L 5/005; H04L 5/0053

USPC .......................................................... 370/311
See application file for complete search history.

(56) References Cited

U.S. PATENT DOCUMENTS

| | | |
|---|---|---|
| 9,736,648 B2 | 8/2017 | Lim et al. |
| 9,801,022 B2 | 10/2017 | Fischer |
| 2010/0323683 A1 | 12/2010 | Kazmi et al. |
| 2013/0190006 A1 | 7/2013 | Kazmi et al. |
| 2015/0018010 A1 | 1/2015 | Fischer |

OTHER PUBLICATIONS

International Search Report and Written Opinion—PCT/US2019/028582—ISA/EPO—dated Sep. 17, 2019.

* cited by examiner

EXPLOITING DRX/CDRX PARAMETERS TO CONSERVE POWER DURING AN OBSERVED TIME DIFFERENCE OF ARRIVAL (OTDOA) SESSION

TECHNICAL FIELD

The various aspects and embodiments described herein generally relate to wireless positioning systems, and in particular, to conserving power usage during an Observed Time Difference of Arrival (OTDOA) measurement session.

BACKGROUND

For various reasons, there may be a desire to know the position or location of a terminal, a mobile station, or other user equipment (UE) such as a cellular phone or Internet of Things (IoT) device. For example, a location services (LCS) client may desire to know the position or location of the UE to support an emergency services call or to provide some other location-based or location-dependent service such as navigation assistance, direction finding, asset tracking, smart metering, and so on. In general, the position or location associated with the UE may be estimated based on information gathered from various systems. One such system may include the Global Positioning System (GPS), which is one example Global Navigation Satellite System (GNSS) or Satellite positioning system (SPS) that typically includes various space vehicles (SVs) orbiting the Earth. Another example system that may be used to estimate the position or location of a UE is a cellular communication system with aerial and/or terrestrial base stations to support communications for various UEs.

A position estimate for a particular UE, which may alternatively be referred to as a position "fix", may be obtained based at least in part on distances or ranges from the UE to one or more transmitters, and also based at least in part on known locations of the one or more transmitters. Ranges to the transmitters may be estimated based on signals transmitted by the transmitters and received at the UE. The location of the transmitters may be ascertained, in at least some cases, based on the identities of the transmitters, and the identities of the transmitters may be ascertained from signals received from the transmitters. In general, the transmitters may comprise SVs in the case of an SPS and/or terrestrial base stations in the case of a cellular communications system where Observed Time Difference of Arrival (OTDOA) positioning techniques may be used.

For example, in OTDOA based positioning, the UE may measure time differences in received signals from multiple base stations that have known positions. Accordingly, the observed time differences in the signals received from the multiple base stations may be used to calculate the location of the UE. To further help location determination, a base station (BS) such as an eNodeB (eNB) may transmit Positioning Reference Signals (PRS) to improve OTDOA positioning performance. The measured time difference of arrival of the PRS from a reference cell (e.g., the serving cell) and one or more neighbor cells is known as a Reference Signal Time Difference (RSTD). The position associated with the UE may then be calculated using the RSTD measurements, the absolute or relative transmission timing of each cell, and the known position(s) of physical transmitting antenna(s) for the reference and neighbor cells. As such, OTDOA positioning techniques are a viable alternative positioning method that can be applied in many use cases, especially in harsh environmental conditions where GNSS signals are unavailable (e.g., indoors, in parking garages, tunnels, etc.).

Indeed, some carriers in the United States have mandated inter-frequency (IF) OTDOA to cover locations where eNBs have been isolated on one frequency but many more eNBs are present on other frequencies. Nevertheless, OTDOA-based positioning techniques present certain challenges. For example, in order to be able to measure the PRS from the reference cell and neighbor cells, the UE may send an assistance data request to an OTDOA system server, which may be referred to as a Location Server (LS) or Position Determining Entity (PDE). The server will then send cell information (e.g., cell configuration and timing info) to the UE. The server can also "push" the cell information to the UE without the UE affirmatively requesting the information. The cell information provided to the UE, by way of the generated assistance data, helps the UE to search for the PRS (Positioning Reference Signals). However, in a UE with limited hardware capabilities (e.g., a device that has a single radio frequency (RF) chain, low processing power, low memory, etc.), power optimization is an area of focus because the UE may need to survive on battery power for a substantial time period, sometimes as long as many years. One way to optimize power consumption is to use a Discontinuous Reception (DRx) or Connected Mode DRx (CDRx) cycle, as described in various public technical specifications available from the 3rd Generation Partnership Project (3GPP). As such, when IF-PRS signals used to perform IF-OTDOA measurements collide with a DRx/CDRx ON duration, the UE may need measurement gaps to define time periods when no uplink or downlink transmissions will be scheduled in order to perform the IF-OTDOA measurements (e.g., because the UE needs to monitor a downlink channel during the DRx/CDRx ON state such that the IF-PRS signals may not be received).

Among other problems, measurement gaps may therefore extend the time before which the UE is able to get a position fix and/or may limit the accuracy of the fix because time/resource constraints within the UE limit the number of PRS signals that can be received and thus used for OTDOA positioning. Furthermore, a network node (e.g., at an eNB) typically configures the gap pattern for the UE, which can be a substantial burden on the eNB/network, especially as IoT devices and other UEs contemplated to use OTDOA positioning are expected to be deployed in substantial numbers. Moreover, because measurement gaps define time periods when no uplink or downlink transmissions will be scheduled, measurement gaps may lead to underutilization and/or potentially limit network throughput. Accordingly, improved OTDOA positioning methods that can also reduce power consumption are desired.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

Various aspects and embodiments disclosed herein pertain to conserving power usage during an Observed Time Difference of Arrival (OTDOA) measurement session. For example, a server or other network entity may receive information related to a Discontinuous Reception (DRx) or Connected Mode DRx (CDRx) configuration associated with a user equipment (UE) and provide, to the UE, information related to one or more base stations having Positioning Reference Signal (PRS) occasions that coincide with an OFF state associated with the DRx/CDRx configuration. Alternatively and/or additionally, the UE may receive OTDOA assistance information indicating when certain PRS occasions occur and a serving base station or other network entity may provide the UE with a DRx/CDRx configuration having an OFF state that coincides with the PRS occasions. As such, the DRx/CDRx parameters may be exploited to substantially reduce or eliminate measurement gaps and conserve power usage during an OTDOA session.

According to various aspects, a method for exploiting discontinuous reception (DRx) parameters to conserve power during an Observed Time Difference of Arrival (OTDOA) measurement session may comprise receiving, at a network server, information related to a DRx configuration associated with a user equipment (UE), selecting, at the network server, one or more inter-frequency base stations having inter-frequency Positioning Reference Signals (PRS) occasions that coincide with an OFF duration of the DRx configuration associated with the UE, and transmitting, by the network server, OTDOA assistance data to the UE, wherein the transmitted OTDOA assistance data may include information related to the inter-frequency PRS occasions that coincide with the OFF duration of the DRx configuration associated with the UE.

According to various aspects, an apparatus may comprise a receiver configured to receive information related to a discontinuous reception (DRx) configuration associated with a user equipment (UE), at least one processor configured to select one or more inter-frequency base stations having inter-frequency Positioning Reference Signals (PRS) occasions that coincide with an OFF duration of the DRx configuration associated with the UE, and a transmitter configured to transmit, to the UE, Observed Time Difference of Arrival (OTDOA) assistance data that may include information related to the inter-frequency PRS occasions that coincide with the OFF duration of the DRx configuration associated with the UE.

According to various aspects, another method for exploiting discontinuous reception (DRx) parameters to conserve power during an Observed Time Difference of Arrival (OTDOA) measurement session may comprise receiving, at a network device serving a user equipment (UE), information related to OTDOA assistance data provided to the UE, wherein the information related to the OTDOA assistance data provided to the UE may include timing associated with one or more inter-frequency Positioning Reference Signals (PRS) occasions, selecting, at the network device, a DRx configuration in which an OFF duration at least partially coincides with the timing associated with the one or more inter-frequency PRS occasions indicated in the OTDOA assistance data, and transmitting, by the network device, one or more parameters related to the selected DRx configuration to the UE such that the one or more inter-frequency PRS occasions are measured during the OFF duration of the DRx configuration.

According to various aspects, an apparatus may comprise a receiver configured to receive information related to Observed Time Difference of Arrival (OTDOA) assistance data provided to a user equipment (UE) served by the apparatus, wherein the information related to the OTDOA assistance data provided to the UE may include timing associated with one or more inter-frequency Positioning Reference Signals (PRS) occasions, at least one processor configured to select a discontinuous reception (DRx) configuration in which an OFF duration at least partially coincides with the timing associated with the one or more inter-frequency PRS occasions indicated in the OTDOA assistance data, and a transmitter configured to transmit one or more parameters related to the selected DRx configuration to the UE such that the UE is configured to measure the one or more inter-frequency PRS occasions during the OFF duration of the DRx configuration.

Other objects and advantages associated with the aspects and embodiments disclosed herein will be apparent to those skilled in the art based on the accompanying drawings and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
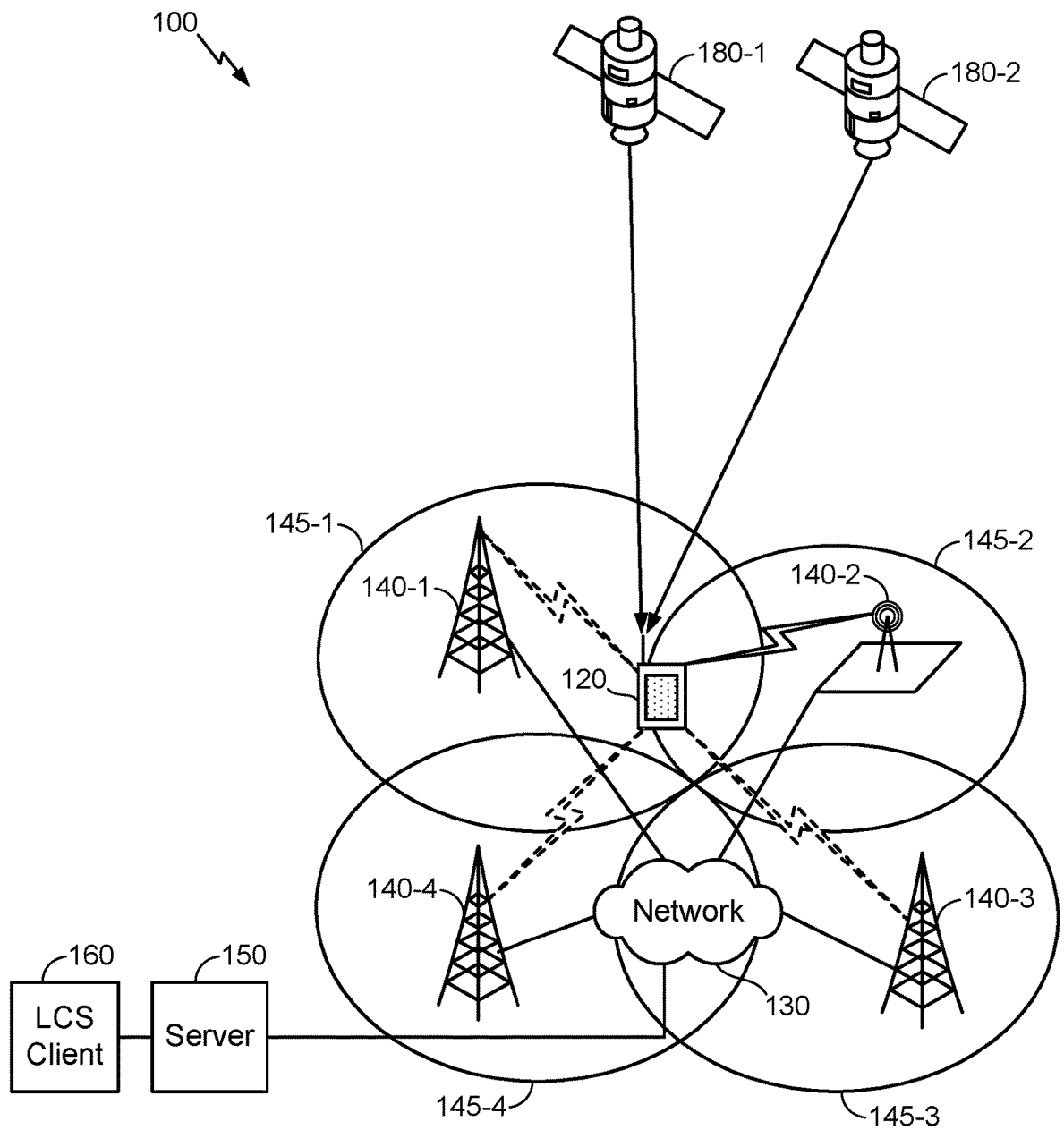
FIG. 1 illustrates an exemplary system in which location services can be provided to a user equipment (UE), according to various aspects.

Various aspects and embodiments are disclosed in the following description and related drawings to show specific examples relating to exemplary aspects and embodiments. Alternate aspects and embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage, or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (or "UE"), "user device," "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device that can receive wireless communication and/or navigation signals. These terms are also intended to include devices which communicate with another device that can receive wireless communication and/or navigation signals such as by short-range wireless, infrared, wireline connection, or other connection, regardless of whether satellite signal reception, assistance data reception, and/or position-related processing occurs at the device or at the other device. In addition, these terms are intended to include all devices, including wireless and wireline communication devices, that can communicate with a server, such as via the Internet, a wireless local area network (WLAN), a cellular wireless network, etc., regardless of whether satellite signal reception, assistance data reception, and/or position-related processing occurs at the device, at the server, or at another device associated with the network. Any operable combination of the above are also considered a "user equipment."

According to various aspects, FIG. 1 illustrates an exemplary system 100 in which location services can be provided to a user equipment (UE) 120. For example, as will be described in further detail herein, the system 100 shown in FIG. 1 may include a server 150 configured to transfer location information or location assistance data to the UE 120 using messages such as Long Term Evolution (LTE) Positioning Protocol (LPP) or LPP extensions (LPPe) messages, wherein the location information or location assistance data may be suitable for use in Observed Time Difference of Arrival (OTDOA) positioning techniques. In various embodiments, those skilled in the art will appreciate that the server 150 may take the form of a Location Server (LS), a Position Determining Entity (PDE), and/or another suitable network entity. The transfer of the location information and/or location assistance data (e.g., OTDOA assistance data) may occur at a rate appropriate to both the UE 120 and the server 150. LPP is well-known and described in various publicly available technical specifications from the 3rd Generation Partnership Project (3GPP). LPPe has been defined by the Open Mobile Alliance (OMA) and may be used in combination with LPP such that each combined LPP/LPPe message would be an LPP message comprising an embedded LPPe message.

For simplicity, only one UE 120 and one server 150 are shown in FIG. 1. In general, however, the system 100 may comprise multiple cells indicated by 145-$k$ ($0 \le k \le N_{cell}$, where $N_{cells}$ is the number of cells) with additional networks 130, LCS clients 160, UEs 120, servers 150, (base station) antennas 140, and Space Vehicles (SVs) 180. The system 100 may further comprise a mix of cells including macrocells such as cells 145-1, 145-3, and 145-4 along with one or more femtocells such as cell 145-2 consistent with the aspects and embodiments disclosed herein.

In various embodiments, the UE 120 may be capable of wirelessly communicating with the server 150 through one or more networks 130 that support positioning and location services, which may include but are not limited to the Secure User Plane Location (SUPL) location solution defined by OMA and the Control Plane (CP) location solution defined by 3GPP for use with an LTE serving network. For example, Location Services (LCS) may be performed on behalf of an LCS Client 160 that accesses the server 150 (which may take the form of a location server) and issues a request for the location of the UE 120. The server 150 may then respond to the LCS client 160 with a location estimate for the UE 120. The LCS Client 160 may also be known as a SUPL Agent (e.g., when the location solution used by the server 150 and the UE 120 is SUPL). In various embodiments, the UE 120 may also include an LCS Client or a SUPL agent (not shown in FIG. 1) that may issue a location request to an appropriate positioning capable function within the UE 120 and later receive back a location estimate for the UE 120. The LCS Client or SUPL Agent within the UE 120 may perform location services for the user of the UE 120 (e.g., provide navigation directions or identify points of interest within the vicinity of the UE 120).

In various embodiments, the server 150 as used in conjunction with the various aspects and embodiments disclosed herein may be a SUPL Location Platform (SLP), an evolved Serving Mobile Location Center (eSMLC), a Serving Mobile Location Center (SMLC), a Gateway Mobile Location Center (GMLC), a PDE, a Standalone SMLC (SAS), and/or the like.

As illustrated in FIG. 1, the UE 120 may communicate with the server 150 through the network 130 and antennas 140 associated with the network 130. The UE 120 may receive and measure signals from antennas 140, which may be used for position determination. For example, the UE 120 may receive and measure signals from one or more of antennas 140-1, 140-2, 140-3 and/or 140-4, which may be associated with cells 145-1, 145-2, 145-3 and 145-4, respectively. In various embodiments, antennas 140 may form part of a wireless communication network, which may be a wireless wide area network (WWAN), wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMax network, and so on.

A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or another suitable RAT. GSM, W-CDMA, and LTE are described in documents from 3GPP. Cdma2000 is described in documents from a consortium named "3rd Generation Partnership Project 2" (3GPP2). 3GPP and 3GPP2 documents are publicly available. A WLAN may be an Institute of Electrical and Electronics Engineers (IEEE) 802.11x network, and a WPAN may be a Bluetooth network, an IEEE 802.15x, or another suitable network type. The techniques may also be implemented in conjunction with any combination of WWAN, WLAN and/or WPAN. For example, the antennas 140 and network 130 may form part of an evolved Universal Mobile Telecommunications System (UMTS) Terrestrial Radio Access Network (E-UTRAN) (LTE) network, a W-CDMA UTRAN network, a GSM/EDGE Radio Access Network (GERAN), a 1×RTT network, an Evolution-Data Optimized (EvDO) network, a WiMax network, or a WLAN, for example.

In various embodiments, the UE 120 may optionally also receive signals from one or more Earth-orbiting Space Vehicles (SVs) 180-1 or 180-2 collectively referred to as SVs 180, which may be part of a satellite positioning system (SPS). For example, in various embodiments, the SVs 180 may be in a constellation of Global Navigation Satellite System (GNSS) such as the US Global Positioning System (GPS), the European Galileo system, the Russian Glonass system or the Chinese Compass or BeiDou system. In accordance with certain aspects, the techniques presented herein are not restricted to global systems (e.g., GNSS) for SPS. For example, the techniques provided herein may be applied to or otherwise enabled for use in various regional systems, such as, for example, Quasi-Zenith Satellite System (QZSS) over Japan, Indian Regional Navigational Satellite System (IRNSS) over India, and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc. (e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation (GAGAN) system, etc.). Thus, as used herein an SPS may include any combination of one or more global and/or regional navigation satellite systems and/or augmentation systems, and SPS signals may include SPS, SPS-like, and/or other signals associated with such one or more SPS.

Figure 2:
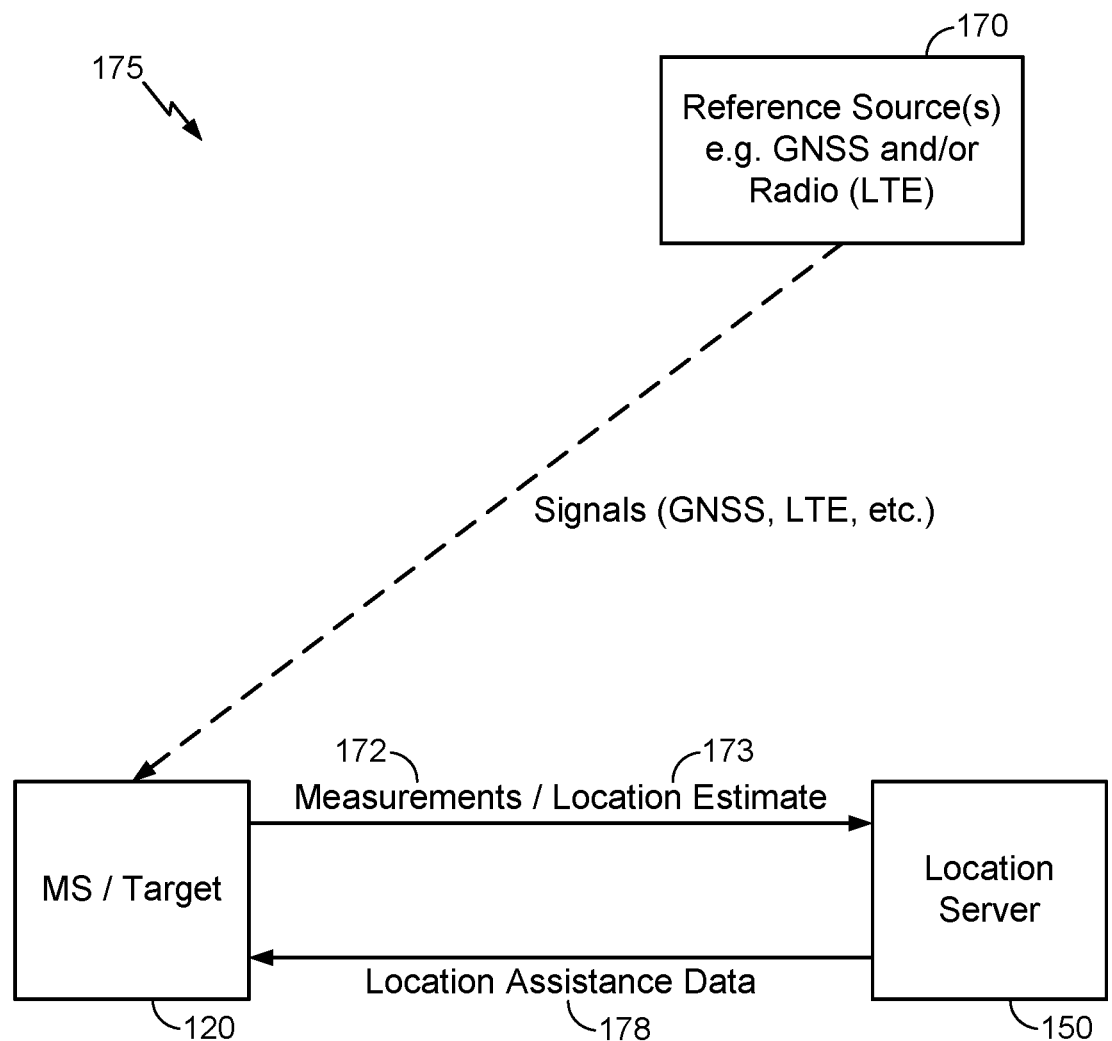
FIG. 2 illustrates a simplified block diagram showing exemplary entities in a system that can provide location services to a UE, according to various aspects.

Referring to FIG. 2, a simplified block diagram is illustrated to show exemplary entities in a system 175 that can provide location services to the UE 120. For example, referring to FIG. 2, the server 150 may be a location server configured to provide location related information, such as an approximate location of the UE 120 and/or location assistance data 178 to the UE 120, which may be used to assist the UE 120 in acquiring and measuring signals from SVs 180 and antennas 140, and/or in deriving or refining a location estimate 173 from measurements 172.

Accordingly, the UE 120 may measure signals from one or more reference source(s) 170 to obtain measurements 172 and/or location estimate 173. The UE 120 may obtain the measurements 172 by measuring pseudo-range measurements for SVs 180 and/or OTDOA related measurements from antennas 140. The reference source(s) 170 may therefore represent signals from SVs 180 and/or antennas 140 associated with cells 145 in network 130. In various instances, the measurements 172 may comprise OTDOA-related measurements that are taken by the UE 120 and sent to the server 150 to derive a position estimate for the UE 120. For example, the UE 120 may provide location related information, such as location estimate 173 or measurements 172 (e.g., various network measurements such as Reference Signal Time Differences (RSTDs) from one or more networks) to the server 150.

In various instances, the UE 120 may also obtain a location estimate 173 by using measurements 172, which may be pseudo-range and/or OTDOA related measurements, to derive an estimated position for the UE 120. For example, the UE 120 may use the difference in the arrival times of downlink radio signals from multiple base stations (such as eNodeBs) to compute the position associated with the UE 120. For example, referring to FIG. 1, if a first signal from cell 145-1 is received at time t1 and a second signal from cell 145-3 is received at time t2, then the OTDOA or Reference Signal Time Difference (RSTD) is given by t2−t1. Generally, t2 and t1 are known as Time Of Arrival (TOA) measurements.

In various embodiments, the UE 120 may take the form of a Secure User Plane (SUPL) Enabled Terminal (SET) and may communicate with the server 150 and use location assistance data 178 to obtain a location estimate or position fix for the UE 120, which may then be communicated to LCS client 160 (not shown in FIG. 2).

According to various aspects, when the position of the UE 120 is estimated using OTDOA positioning techniques, the RSTD measurements representing the relative timing difference between two cells (i.e., a reference cell and a neighbor cell) may be an intra-frequency RSTD measurement or an inter-frequency RSTD measurement. In particular, an intra-frequency RSTD measurement is performed when both the reference cell and the neighbor cell are on the same carrier frequency as the serving cell associated with the UE 120. On the other hand, an inter-frequency RSTD measurement is performed when at least one of the reference cell or the neighbor cell are on a different carrier frequency relative to the serving cell associated with the UE 120. Although RSTD measurements can in principle be performed on any downlink (DL) signals, such as cell-specific reference signals (CRS) or synchronization signals, these DL signals tend to suffer from poor hearability. Such poor hearability may pose challenges for OTDOA positioning when the UE 120 has to detect multiple neighbor cells in order to obtain at least three measurements from geographically dispersed base stations to solve for two coordinates of the UE 120 (e.g., x-y coordinates or a latitude-longitude). Therefore, Positioning Reference Signals (PRS) were introduced into the 3GPP Long Term Evolution (LTE) Release-9 standard to allow proper timing (ranging) measurements of a UE 120 from eNodeB (eNB) signals to improve OTDOA positioning performance.

Figure 3:
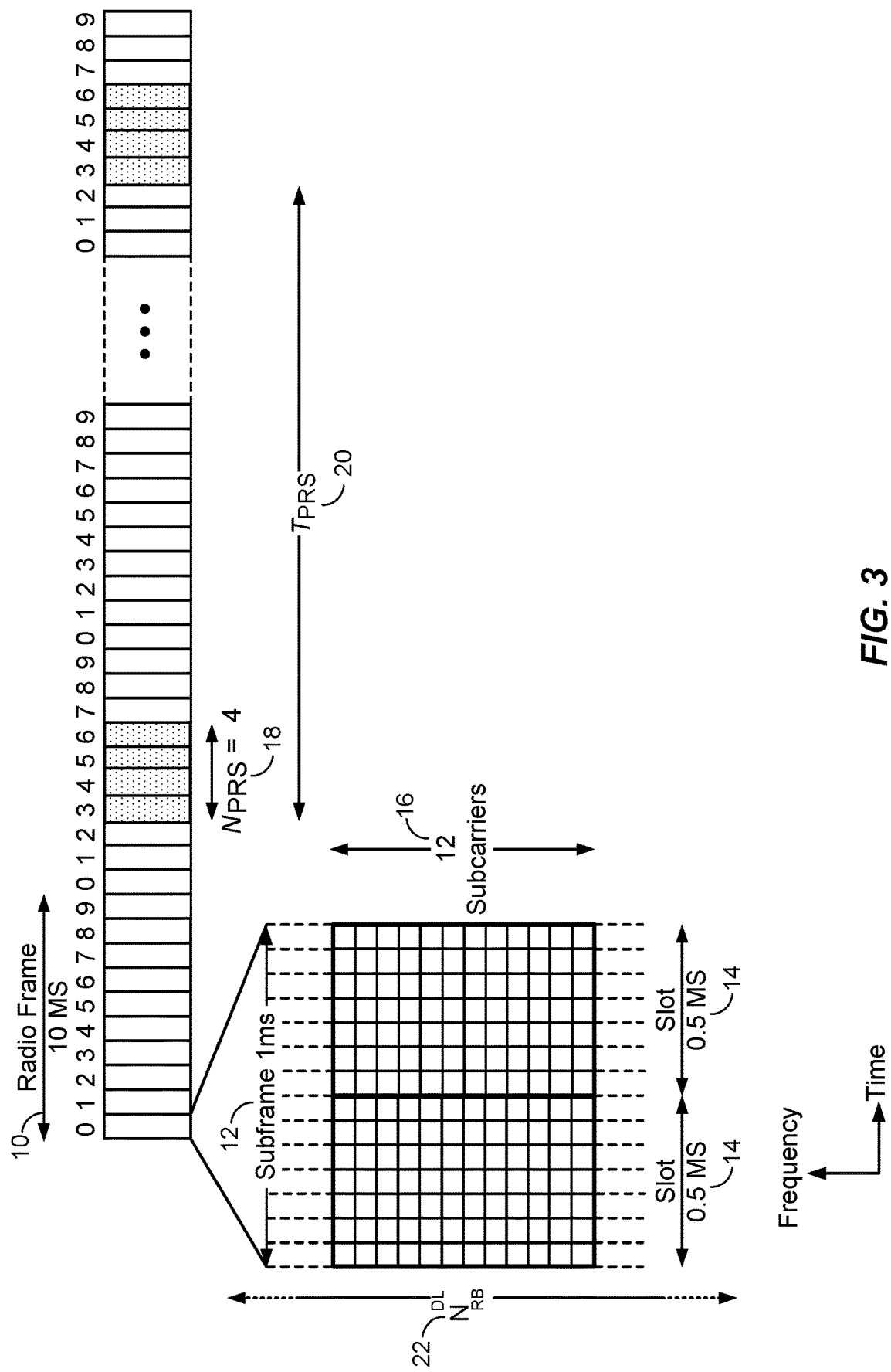
FIG. 3 illustrates an exemplary Positioning Reference Signal (PRS) transmission schedule that may be suitable for use in Observed Time Difference of Arrival (OTDOA) positioning techniques, according to various aspects.
Figure 4:
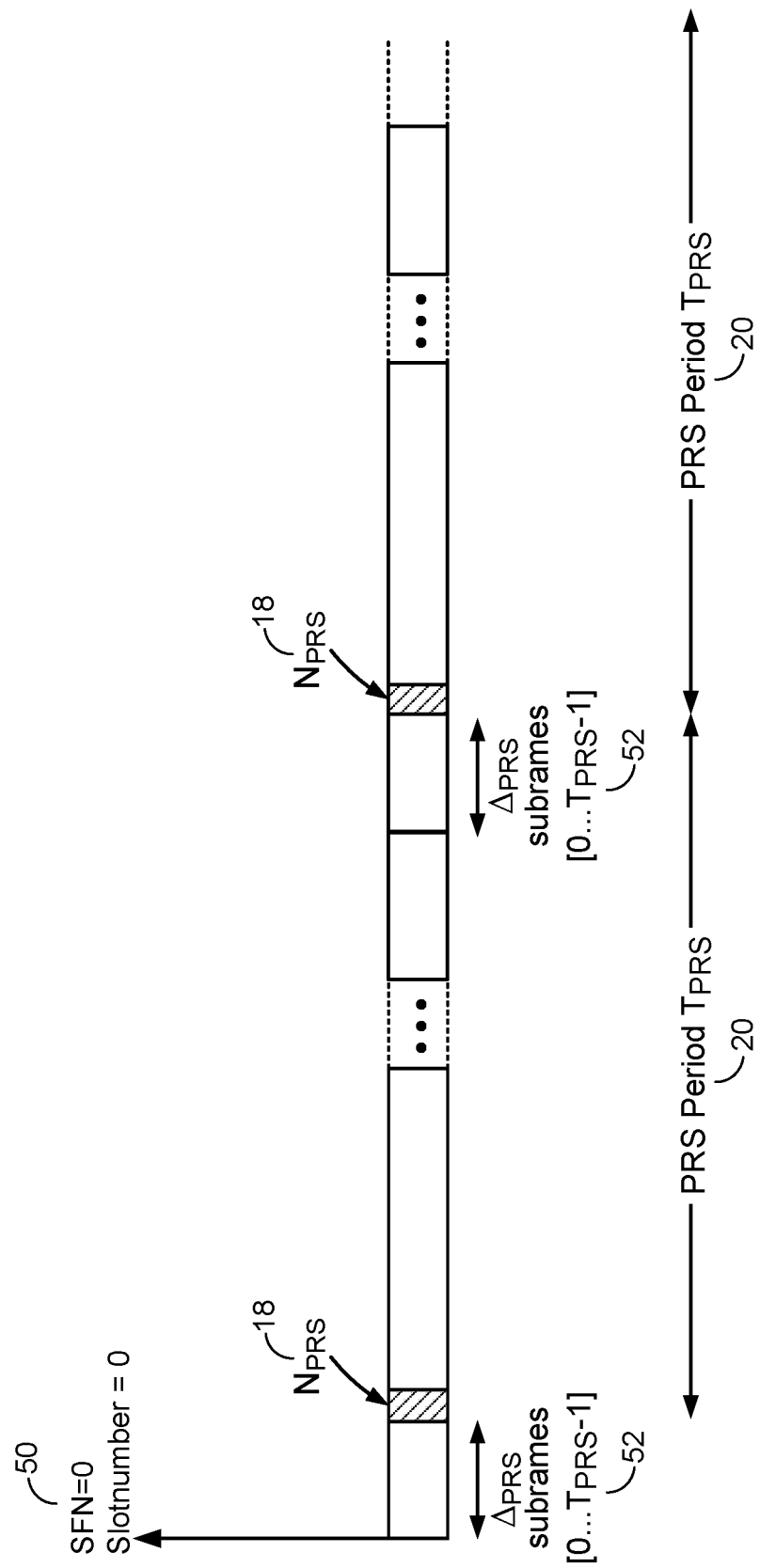
FIG. 4 illustrates an exemplary PRS subframe configuration showing a relationship between a System Frame Number (SFN), a cell-specific subframe offset, and PRS Periodicity, according to various aspects.

For example, according to various aspects, FIG. 3 illustrates an exemplary PRS transmission schedule that may be suitable for use in OTDOA positioning techniques, while FIG. 4 illustrates an exemplary PRS subframe configuration showing a relationship between a System Frame Number (SFN), a cell-specific subframe offset, and PRS Periodicity.

More particularly, referring to FIG. 3, time is shown on the X (horizontal) axis, while frequency is shown on the Y (vertical) axis. As shown in FIG. 3, downlink and uplink LTE Radio Frames 10 each have a ten milliseconds (ms) duration. For downlink Frequency Division Duplex (FDD) mode, the Radio Frames 10 are organized into ten subframes 12 of one millisecond duration each. Each subframe 12 comprises two slots 14, each having a 0.5 ms duration.

In the frequency domain, the available bandwidth may be divided into uniformly spaced orthogonal subcarriers 16. For example, for a normal length cyclic prefix using 15 KHz spacing, the subcarriers 16 may be grouped into a group of twelve. Each grouping, which comprises twelve subcarriers 16 in FIG. 3, is termed a resource block and in the example above the number of subcarriers in the resource block may be written as $N_{SC}^{RB}=12$. For a given channel bandwidth, the number of available resource blocks on each channel, which is also called the transmission bandwidth configuration, is given by $N_{RB}^{DL}$ 22. For example, for a 3 MHz channel bandwidth in the above example, the number of available resource blocks on each channel is given by $N_{RB}^{DL}=15$.

According to various aspects, referring to FIG. 1 in conjunction with FIG. 3, the antennas 140-1 through 140-4 respectively corresponding to cells 145-1 through 145-4 may also transmit Positioning Reference Signals (PRS) as standardized in 3GPP LTE Release-9 in special positioning subframes that are grouped into positioning "occasions". For example, in LTE, the positioning or PRS occasion ($N_{PRS}$) can comprise one, two, four, or six consecutive positioning subframes ($N_{PRS} \varepsilon \{1, 2, 4, 6\}$) and occurs periodically at 160, 320, 640, or 1280 millisecond intervals. In the example shown in FIG. 3, the $N_{PRS}$ 18 is four and may be written as $N_{PRS}=4$. The positioning occasions recur with PRS Periodicity 20. For example, in FIG. 3, the PRS Periodicity 20 is denoted by $T_{PRS}$. In various embodiments, $T_{PRS}$ may be measured in terms of the number of subframes between the start of consecutive positioning occasions.

Within each positioning occasion, the PRS are transmitted with a constant power. The PRS can also be transmitted with zero power (i.e., muted). Muting, which turns off a regularly scheduled PRS transmission, may be useful when PRS patterns between cells overlap. Muting aids signal acquisition by the UE 120. Muting may be viewed as the non-transmission of a PRS for a given positioning occasion in a particular cell. Muting patterns may be signaled to the UE 120 using bitstrings. For example, in a bitstring signaling a muting pattern, if a bit at position j is set to "0", then the UE 120 may infer that the PRS is muted for the $j^{th}$ positioning occasion.

To further improve hearability of PRS, positioning subframes may be low-interference subframes that are transmitted without user data channels. As a result, in ideally synchronized networks, the PRS may receive interference from other cell PRS with the same PRS pattern index (i.e., with the same frequency shift), but not from data transmissions. The frequency shift, in LTE, for example, is defined as a function of the Physical Cell Identifier (PCI) resulting in an effective frequency re-use factor of six.

The PRS configuration parameters such as the number of consecutive positioning subframes, periodicity, muting pattern, etc. may be configured by the network 130 and may be signaled to the UE 120 (e.g. by the server 150) as OTDOA assistance data. For example, LPP or LPPe messages between the UE 120 and the server 150 may be used to transfer location assistance data 178 including OTDOA assistance data. OTDOA assistance data may include reference cell information and a neighbor cell list for one or more neighbor cells. The reference cell and the neighbor cell list may each contain the PCIs of the cells as well as PRS configuration parameters for the cells. Furthermore, in various embodiments, the neighbor cell list may be sorted according to a priority for measurements.

In general, as noted above, OTDOA assistance data is usually provided for one or more "neighbor cells" or "neighboring cells" relative to a "reference cell". For example, OTDOA assistance data may include "expected RSTD" parameters, which provide the UE 120 information about the RSTD values that the UE 120 is expected to measure at a current location together with an uncertainty of the expected RSTD parameter. The expected RSTD together with the uncertainty defines then a search window for the UE 120 where the UE 120 is expected to measure the RSTD value. "Expected RSTDs" for cells in the OTDOA assistance data neighbor cell list are usually provided relative to an OTDOA assistance data reference cell. OTDOA assistance information may also include PRS configuration information parameters, which allow the UE 120 to determine when a PRS positioning occasion occurs on signals received from various cells, and to determine the PRS sequence transmitted from various cells in order to measure a TOA.

Referring now to the exemplary PRS subframe configuration shown in FIG. 4, the cell specific PRS subframe configuration is defined by a "PRS Configuration Index" $I_{PRS}$ included in the OTDOA assistance data according to 3GPP specifications. As shown in FIG. 4, the cell specific subframe offset $\Delta_{PRS}$ 52 may be defined in terms of the number of subframes transmitted starting from System Frame Number zero, Slot Number zero 50 to the start of a PRS positioning occasion. In FIG. 4, the $N_{PRS}$ 18 is four (although not explicitly shown as such). In some embodiments, when the UE 120 receives a PRS configuration index $I_{PRS}$ in the OTDOA assistance data, the UE 120 may determine PRS periodicity $T_{PRS}$ and PRS subframe offset $\Delta_{PRS}$. Upon obtaining information about the frame and slot timing (i.e., the SFN and slot number ($n_f$, $n_s$) for cell 145-k) the UE 120 may determine the frame and slot when a PRS is scheduled in cell 145-k. The OTDOA assistance data is determined by the server 150 and includes assistance data for a reference cell and a number of neighbor cells.

In general, as noted above, OTDOA positioning techniques are a viable positioning method that can be applied in many use cases, such as harsh environmental conditions where GNSS signals may be unavailable (e.g., indoors, in parking garages, tunnels, etc.). Nevertheless, OTDOA-based positioning techniques present certain challenges. For example, in the inter-frequency RSTD example mentioned above, difficulties in OTDOA positioning may arise because the UE 120 may need to (i) stop transmission/reception on the serving cell carrier; (ii) tune the receiver to the frequency (f2) of the neighbor cell (or the reference cell where the serving cell is not used as the reference cell and the reference cell is not on the same carrier frequency as the serving cell); (iii) synchronize to the neighbor cell; (iv) decode the PRS of the neighbor cell; and (v) tune the receiver back to the serving cell frequency (f1).

Accordingly, in conventional systems, inter-frequency RSTD measurements tend to use a measurement gap at the UE 120, wherein a measurement gap generally refers to a time period during which no uplink or downlink transmissions will be scheduled. In general, during on OTDOA measurement session, an eNodeB (eNB) configures the measurement gap in response to a UE-triggered measurement gap request message because OTDOA measurements are otherwise transparent to the eNB. As such, the UE-triggered measurement gap request message is used to make the eNB aware of the need for the UE 120 to perform an inter-frequency positioning measurement. However, measurement gaps tend to suffer from various drawbacks. For example, among other challenges, configuring the measurement gaps can be a substantial burden on the network node(s) used to configure the gap pattern for the UE 120, especially as IoT devices and other UEs 120 contemplated to use OTDOA positioning are expected to be deployed in substantial numbers. Moreover, because measurement gaps define time periods when no uplink or downlink transmissions will be scheduled, measurement gaps may lead to underutilization and/or potentially limit network throughput. Accordingly, improved OTDOA positioning methods are desired, wherein the various aspects and embodiments described in further detail below may advantageously exploit certain power saving parameters in such a way that can also substantially reduce or eliminate measurement gaps.

More particularly, with the ever-increasing popularity of smartphones, IoT devices, and other power sensitive devices, many wireless systems use power optimizations to improve battery life and reduce signaling demands at user devices. For example, one such method is a Discontinuous Reception (DRx) mode used in mobile communication to reduce power consumption and thereby conserve the battery of the UE. The UE and the network negotiate phases in which data transfer occurs, where the receiver is turned on at the UE (e.g., in a connected state). During other times, the UE turns the receiver off and enters a low power state. There is usually a function designed into the protocol for this purpose. For example, the transmission may be structured in slots with headers containing address details so that UEs may listen to these headers in each slot to decide whether or not the transmission is relevant. In this case, the receiver may only be active at the beginning of each slot to receive the header, conserving battery life. Other DRx techniques include polling, whereby the UE is placed into standby for a given amount of time and then a beacon is sent by the base station periodically to indicate if there is any data waiting for the UE.

In LTE, DRx is controlled by the Radio Resource Control (RRC) protocol, wherein RRC signaling sets a DRx cycle where the receiver at the UE is operational for a certain period, typically when all the scheduling and paging information is transmitted. In general, the DRx cycle indicates a number of radio frames in a paging cycle, whereby less battery power may be consumed at the UE as the parameter representing the number of radio frames in the paging cycle increases (i.e., the UE spends more time in the low power state when there are more radio frames in the paging cycle). On the other hand, as the number of radio frames in the paging cycle decreases, battery power consumed at the UE increases. The DRx cycle may be a cell-specific or a UE-specific parameter. For example, the DRx cycle is cell-specific when the eNB configures the DRx cycle and broadcasts the appropriate parameters to all UEs in a cell in a System Information Block 2 (SIB2) as a default paging cycle. The DRx cycle is UE-specific when configured at a Mobility Management Entity (MME) that provides the appropriate parameters to a specific UE in non-access stratum (NAS) signaling as a 'UE-specific DRx cycle' and to the eNB in a PAGING S1 AP message as a 'Paging DRx' for an MME-initiated paging message.

Figure 5:
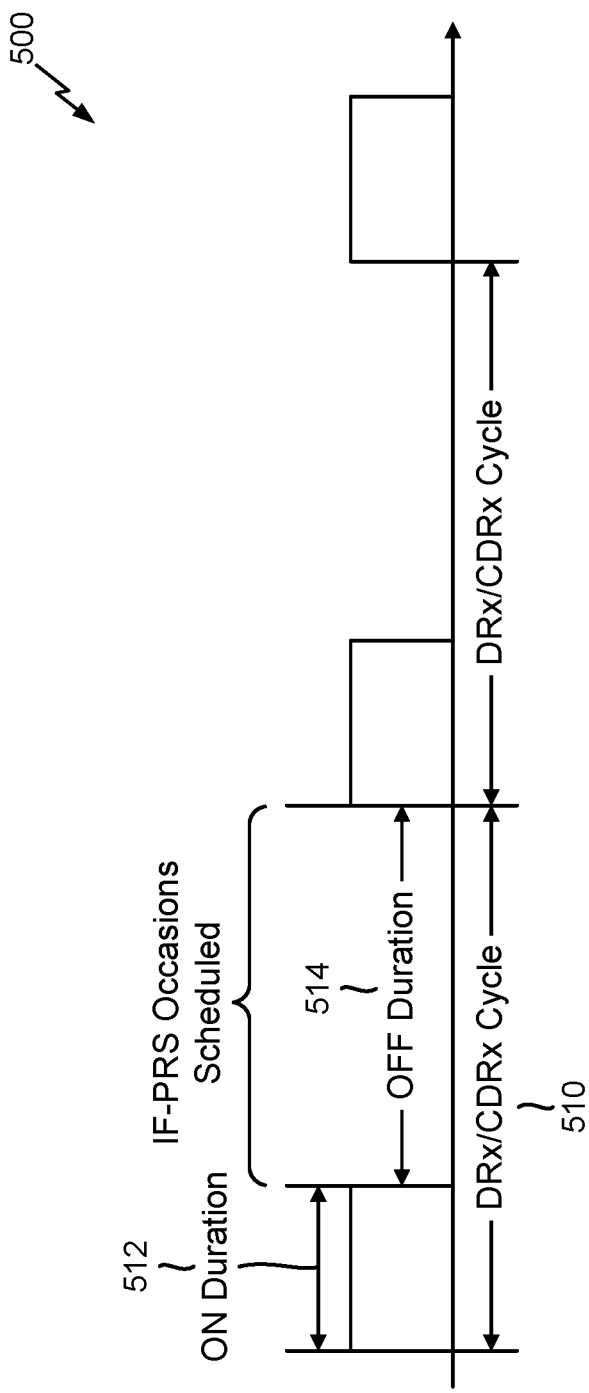
FIG. 5 illustrates an exemplary timeline in which a Discontinuous Reception (DRx)/Connected Mode DRx (CDRx) cycle has an OFF duration that coincides with inter-frequency PRS occasions, according to various aspects.

For example, according to various aspects, FIG. 5 illustrates an exemplary timeline 500 in which a UE may follow a DRx cycle or a Connected Mode DRx (CDRx) cycle 510. In particular, as shown in FIG. 5, the DRx/CDRx cycle 510 allocated to the UE may include allocated an ON duration 512 during which the UE may monitor downlink transmissions such as a Physical Downlink Control CHannel (PDCCH). Outside the ON duration 512, the DRx/CDRx cycle 510 includes an OFF duration 514 during which the UE may enter a sleep mode for battery saving or to acquire an inter-frequency/inter-radio access technology (RAT) signal such as PRS. According to various aspects, this mechanism allowing the UE to acquire inter-frequency/inter-RAT signals during the OFF duration 514 may advantageously be exploited to substantially reduce or eliminate measurement gaps and conserve power usage during an OTDOA session.

More particularly, in a typical scenario, the UE may receive one or more network-configured DRx/CDRx configuration parameters in an RRC Connection Setup and/or RRC Connection Reconfiguration message. For example, the DRx/CDRx configuration parameters may include a DrxInactivityTimer to specify how long the UE should remain 'ON' after the reception of a PDCCH, an OnDurationTimer to specify the ON duration 512 within one DRx/CDRx cycle 510, and/or other suitable parameters (e.g., shortDrxTimer, LongDrxCycle, drxStartOffset, drxShortCycleTimer, etc.). In context with an OTDOA measurement session, a UE may need measurement gaps in the event that inter-frequency PRS occasions collide with the ON duration 512. However, if the UE can receive OTDOA assistance data such that at least some (preferably most or all) inter-frequency PRS occasions coincide with the DRx/CDRx OFF duration 514, then measurement gaps may not be necessary to obtain inter-frequency OTDOA measurements (e.g., because the UE can measure an inter-frequency signal during such times). Accordingly, once the UE receives the OTDOA assistance data from the LS, PDE, or other suitable network entity, the UE may start PRS measurements until a timeout period expires or valid and/or qualified measurements are obtained. During this time, the UE may suitably enter the DRx/CDRx cycle 510 because an active connection is not necessary until if and/or when OTDOA measurements need to be reported back to the LS/PDE.

According to various aspects, to provide the UE with optimized OTDOA assistance data such that some, most, or all PRS occasions coincide with the DRx/CDRx OFF duration 514, the UE can send the DRx/CDRx configuration that will be used to obtain PRS measurements to the LS/PDE. In various embodiments, the UE may send the appropriate DRx/CDRx configuration parameters to the LS/PDE using one or more messages that are consistent with protocols associated with the Secure User Plane Location (SUPL) solution defined by OMA, the Control Plane (CP) solution defined by 3GPP, and/or other applicable standards. For example, in various embodiments, the UE may send the appropriate DRx/CDRx configuration parameters to the LS/PDE via an LPP Provide Capabilities message. The LS/PDE can then select inter-frequency OTDOA assistance data (e.g., inter-frequency eNBs) that transmit PRS occasions that coincide with the DRx/CDRx OFF duration 514, thus reducing or eliminating a need for measurement gaps (e.g., the need for measurement gaps may be eliminated if all inter-frequency PRS occasions coincide with the OFF duration 514 or reduced when some inter-frequency PRS occasions coincide with the OFF duration 514 and others coincide with the ON duration 512). Furthermore, as noted above, the OTDOA assistance data may typically include a neighbor cell list for one or more neighbor cells, which may be sorted according to a priority for measurements. As such, in various embodiments, the inter-frequency OTDOA assistance data may prioritize the inter-frequency eNBs in the neighbor cell list according to how effectively the inter-frequency eNBs reduce the need for measurement gaps. For example, the neighbor cell list may include all possible inter-frequency eNBs that can be used for OTDOA positioning, which may be sorted according to an extent to which the PRS occasions transmitted by the inter-frequency eNBs align with the DRx/CDRx OFF duration 514. As such, the neighbor cell list may order the multiple eNBs according to a priority based at least in part on an extent to which the inter-frequency PRS occasions align with the OFF duration 514 of the DRx/CDRx configuration associated with the UE and the assistance data transmitted to the UE can include the generated list. In one example, the list is ordered so that eNBs with longer periods of time that align with the OFF duration 514 of the DRx/CDRx configuration appear on the list before eNBs with shorter periods of time that align with the OFF duration 514 of the DRx/CDRx configuration. In other examples, the neighbor cell list may only include inter-frequency eNBs that transmit PRS occasions that completely align or otherwise coincide with the DRx/CDRx OFF duration 514, a subset of the inter-frequency eNBs that transmit PRS occasions that at least partially align or otherwise coincide with the DRx/CDRx OFF duration 514, and so on.

According to various aspects, rather than (or in addition to) having the UE send the appropriate DRx/CDRx configuration parameters to the LS/PDE, various embodiments contemplated herein may allow the LS/PDE to communicate with an eNB or MME serving the UE to obtain the appropriate DRx/CDRx configuration parameters. For example, because carriers generally maintain the LS/PDE, the LS/PDE may have the ability to suitably predict the DRx/CDRx configuration parameters that will be assigned to a given UE. As such, in various embodiments, the LS/PDE may be configured to communicate with the eNB or MME serving the UE to obtain the appropriate DRx/CDRx configuration parameters and fine tune the inter-frequency OTDOA assistance data provided to the UE such that the inter-frequency eNBs selected for inclusion in the OTDOA assistance data have PRS occasions that coincide with the DRx/CDRx OFF duration 514 expected to be assigned to the UE. Furthermore, in a similar manner as described in further detail above, the inter-frequency OTDOA assistance data may be prioritized according to how effectively the inter-frequency eNBs reduce the need for measurement gaps.

According to various aspects, in another possible implementation, the DRx/CDRx cycle 510 may be configured according to the applicable PRS transmission schedule as defined in the inter-frequency OTDOA assistance data provided to the UE. In such example embodiments, the UE may receive the inter-frequency OTDOA assistance data from the LS/PDE, which may indicate the applicable PRS transmission schedule. As noted above, the UE may then enter DRx/CDRx mode until a timeout period expires or valid and/or qualified OTDOA measurements are obtained. As such, in various embodiments, the UE may communicate with the serving MME to request a UE-specific DRx/CDRx configuration that best suits the inter-frequency OTDOA assistance data received from the LS/PDE (i.e., a DRx/CDRx cycle 510 having a configuration in which the OFF duration 514 coincides with the inter-frequency PRS occasions indicated in the received inter-frequency OTDOA assistance data). Alternatively and/or additionally, because a carrier may maintain the LS/PDE as well as the eNB/MME, the eNB/MME may communicate with the LS/PDE to determine the appropriate timing associated with the PRS occasions indicated in the inter-frequency OTDOA assistance data provided to the UE and thus provide the UE with an optimized DRx/CDRx configuration that most effectively reduces measurement gaps by having an OFF duration 514 that coincides with the inter-frequency PRS occasions.

Figure 6:
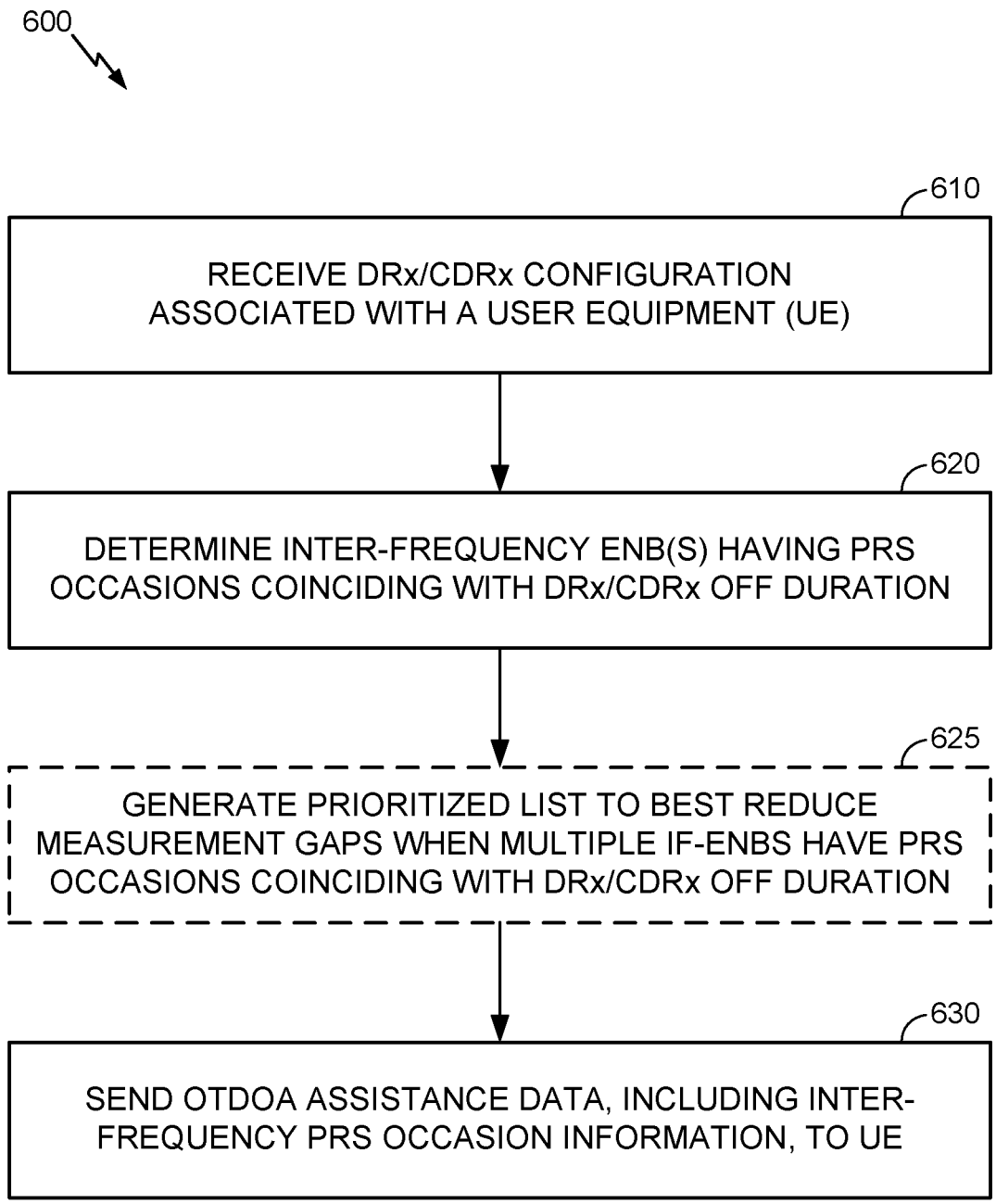
FIG. 6 illustrates an exemplary method that a Location Server (LS) or Position Determining Entity (PDE) may perform to select one or more inter-frequency eNodeBs (eNBs) having PRS occasions that coincide with a DRx/CDRx OFF duration in use at a user equipment (UE), according to various aspects.

According to various aspects, FIG. 6 illustrates an exemplary method 600 that a Location Server (LS), Position Determining Entity (PDE), or other suitable network device may perform to select one or more inter-frequency eNode Bs (eNBs) having PRS occasions that coincide with a DRx/CDRx OFF duration assigned to a UE.

In various embodiments, the network device may receive a DRx/CDRx configuration associated with the UE at block 610, wherein the received DRx/CDRx configuration may be cell-specific (configured at an eNB serving the UE) or UE-specific (configured at an MME serving the UE). In various embodiments, the DRx/CDRx configuration may be received from the UE via an LPP Provide Capabilities message. Alternatively and/or additionally, the DRx/CDRx configuration may be received from an eNB or MME serving the UE. In any case, at block 620, the network device may determine one or more inter-frequency eNBs that have PRS occasions that coincide with an OFF duration associated with the DRx/CDRx configuration assigned to the UE. Furthermore, in various embodiments, the network device may optionally generate a list of inter-frequency eNBs at block 625 based on how effectively the inter-frequency eNBs can reduce a need for measurement gaps at the UE. For example, as mentioned above, the list may include all possible inter-frequency eNBs that can be used for OTDOA positioning, which may be sorted according to an extent to which the PRS occasions transmitted by the inter-frequency eNBs align with the DRx/CDRx OFF duration used at the UE. As such, the list may order the multiple eNBs according to a priority based at least in part on an extent to which the inter-frequency PRS occasions align with the OFF duration of the DRx/CDRx configuration associated with the UE and the assistance data transmitted to the UE can include the generated list. In one example, the list is ordered so that eNBs with longer periods of time that align with the OFF duration of the DRx/CDRx configuration appear on the list before eNBs with shorter periods of time that align with the OFF duration of the DRx/CDRx configuration. In other examples, the list may only include inter-frequency eNBs that transmit PRS occasions that completely align or otherwise coincide with the DRx/CDRx OFF duration, a subset of the inter-frequency eNBs that transmit PRS occasions that at least partially align or otherwise coincide with the DRx/CDRx OFF duration, and/or any suitable combination thereof.

In various embodiments, at block 630, the network device may send OTDOA assistance data, including information relating to inter-frequency PRS occasions, to the UE. As such, the UE may then enter a DRx/CDRx mode according to the assigned DRx/CDRx configuration and utilize the OTDOA assistance data to obtain the appropriate inter-frequency measurements based on the inter-frequency PRS occasions that occur during the DRx/CDRx OFF duration.

Figure 7:
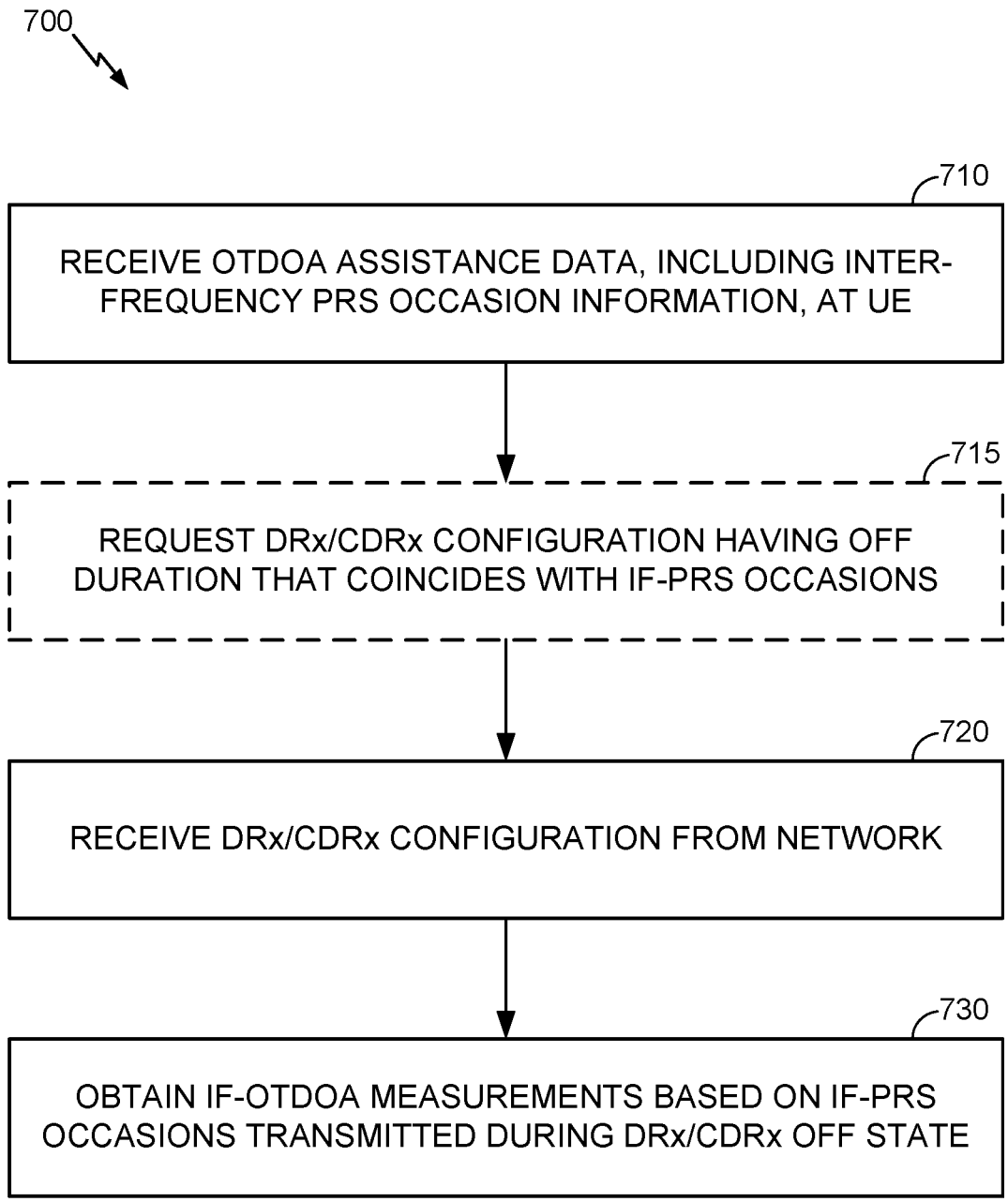
FIG. 7 illustrates an exemplary method that a UE may perform to obtain inter-frequency Observed Time Difference of Arrival (OTDOA) measurements based on PRS occasions received during a DRx/CDRx OFF state, according to various aspects.

According to various aspects, FIG. 7 illustrates an exemplary method 700 that a UE may perform to obtain inter-frequency Observed Time Difference of Arrival (OTDOA) measurements based on inter-frequency PRS occasions that are transmitted during a DRx/CDRx OFF state associated with the UE. For example, at block 710, the UE may receive OTDOA assistance data from a Location Server (LS), PDE, and/or other suitable network device. In general, the received OTDOA assistance data may include information related to one or more inter-frequency PRS occasions (e.g., timing information associated with PRS transmissions from one or more inter-frequency eNBs). In various embodiments, at block 715, the UE may then optionally request, from an eNB or MME serving the UE, a DRx/CDRx configuration in which an OFF duration coincides with all, a majority, or at least some of the inter-frequency PRS occasions in the received OTDOA assistance data. Alternatively, in various embodiments, the eNB or MME serving the UE may obtain the relevant OTDOA assistance data from the LS/PDE and then select the appropriate DRx/CDRx configuration in which the OFF duration coincides with the inter-frequency PRS occasions in the OTDOA assistance data, in which case block 715 may be omitted.

In various embodiments, whether the eNB/MME receives the information related to the inter-frequency PRS occasions indicated in the OTDOA assistance data from the UE or the LS/PDE, the eNB/MME may select the DRx/CDRx configuration in which the OFF duration best coincides with the inter-frequency PRS occasions in an effort to reduce a need for measurement gaps at the UE. In one example, the DRx/CDRx configuration is selected to maximize the extent to which the one or more inter-frequency PRS occasions align with the OFF duration of the DRx/CDRx configuration. The eNB/MME may then signal the DRx/CDRx configuration to the UE such that the UE receives the DRx/CDRx configuration from the network at block 720. For example, as mentioned above, the DRx/CDRx configuration parameters may be cell-specific or UE-specific parameter, wherein the eNB may configure the DRx/CDRx configuration parameters and broadcast the appropriate parameters to the UE and any other UEs in a cell in a System Information Block 2 (SIB2) as a default paging cycle. As such, as noted above, the DRx/CDRx configuration can include one or more cell-specific parameters (or one or more UE-specific parameters) configured at the eNB (or the MME) serving the UE. Alternatively, for a UE-specific DRx/CDRx configuration, the MME may configure the appropriate parameters and signal the same to the UE in NAS signaling as a 'UE-specific DRx cycle' and to the eNB in a PAGING S1 AP message. In either case, at block 730, the UE may enter the DRx/CDRx mode based on the configuration received at block 720 and then start the OTDOA measurement session to obtain the inter-frequency OTDOA measurements based on the inter-frequency PRS occasions transmitted during the DRx/CDRx OFF duration until a timeout period expires or valid/qualified measurements are obtained.

Figure 8:
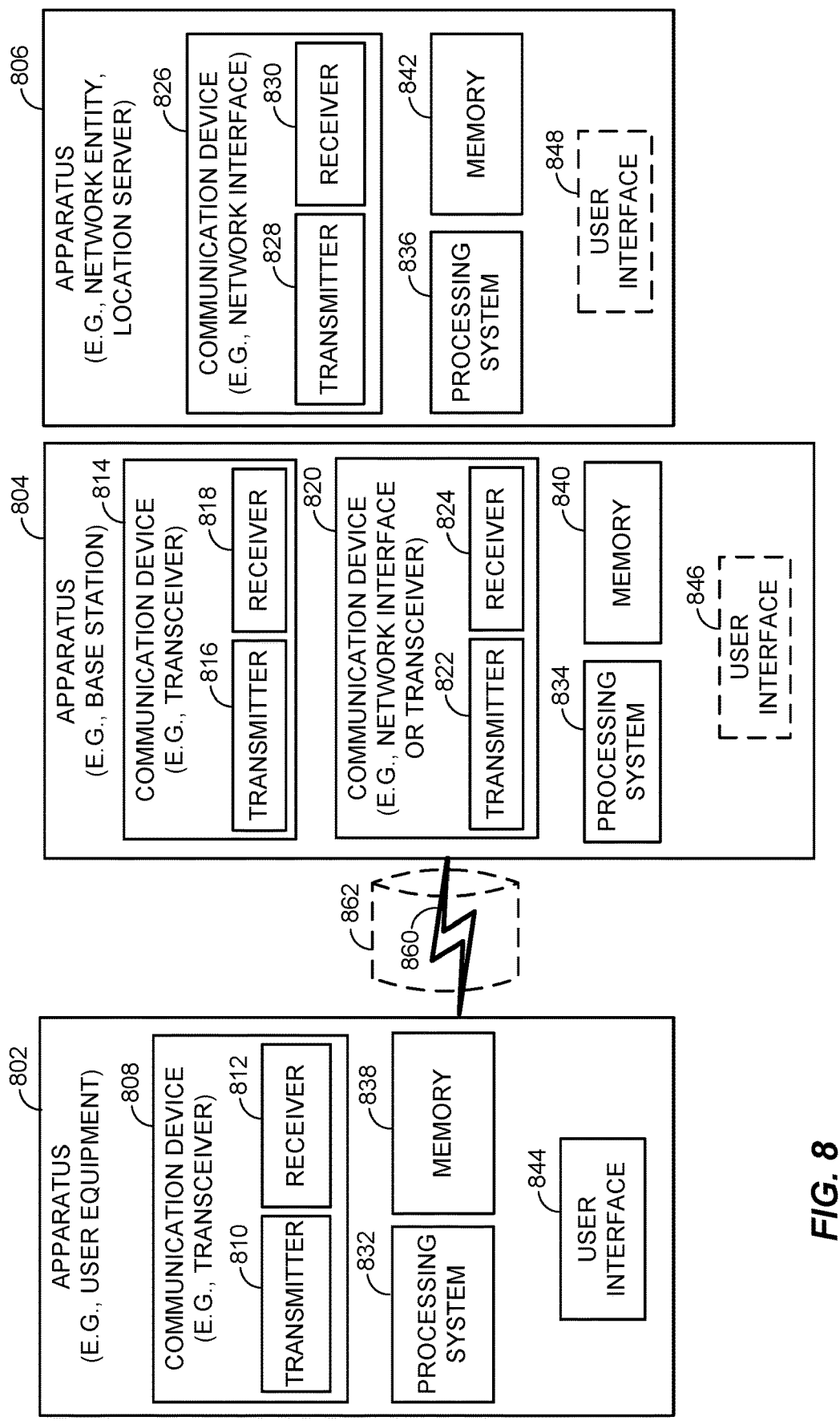
FIG. 8 illustrates a simplified block diagram showing exemplary components associated with wireless communication nodes that may be configured in accordance with the various aspects and embodiments described herein.

FIG. 8 illustrates several sample components that may be incorporated into an apparatus 802, an apparatus 804, and an apparatus 806 that may be configured in accordance with the various aspects and embodiments described herein (e.g., the apparatuses 802, 804, 806 may respectively correspond to a UE, a base station such as an eNodeB and/or a network entity such as an MME, and a network entity such as a location server or PDE). Those skilled in the art will appreciate that the components may be implemented in different types of apparatuses in different implementations (e.g., in an ASIC, in a system on chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The apparatus 802 and the apparatus 804 each include at least one wireless communication device (represented by the communication devices 808 and 814) for communicating with other nodes via at least one designated radio access technology (RAT) (e.g., LTE). Each communication device 808 includes at least one transmitter (represented by the transmitter 810) for transmitting and encoding signals (e.g., measurements, messages, indications, information, and so on) and at least one receiver (represented by the receiver 812) for receiving and decoding signals (e.g., reference signals, messages, indications, information, pilots, and so on). For example, receiver 812 may receive DRx/CDRx configuration parameters from an eNB/MME, OTDOA assistance data from a LS or PDE, and/or PRS for use in obtaining OTDOA measurements as described herein. Transmitter 810 may be used to transmit DRx/CDRx configuration parameters to the LS/PDE and/or to transmit a request for a specific DRx/CDRx configuration to an eNB/MME according to techniques described in further detail herein. Similarly, each communication device 814 includes at least one transmitter (represented by the transmitter 816) for transmitting signals (e.g., reference signals, messages, indications, information, pilots, and so on) and at least one receiver (represented by the receiver 818) for receiving signals (e.g., messages, indications, information, and so on). For example, transmitter 816 may be used to transmit PRS, cell-specific or UE-specific DRx/CDRx configuration parameters, and/or other suitable information as described herein. Receiver 818 may be used to receive signals transmitted by apparatus 802 and/or apparatus 806 as described herein.

A transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. A wireless communication device (e.g., one of multiple wireless communication devices) of the apparatus 804 may also comprise a Network Listen Module (NLM) or the like for performing various measurements.

The apparatus 804 and the apparatus 806 include at least one communication device (represented by the communication device 820 and the communication device 826) for communicating with other nodes. For example, the communication device 826 may comprise a network interface that is configured to communicate with one or more network entities via a wired or wireless backhaul connection. In some aspects, the communication device 826 may be implemented as a transceiver configured to support wired or wireless signal communication. This communication may involve, for example, sending and receiving messages, parameters, or other types of information. Accordingly, in the example of FIG. 8, the communication device 826 is shown as comprising a transmitter 828 and a receiver 830. Similarly, the communication device 820 may comprise a network interface that is configured to communicate with one or more network entities via a wired or wireless backhaul. As with the communication device 826, the communication device 820 is shown as comprising a transmitter 822 and a receiver 824. The apparatuses 802, 804, and 806 also include other components that may be used in conjunction with the operations as disclosed herein. For example, in various embodiments, the apparatuses 802, 804, 806 may include respective processing systems 832, 834, 836 (e.g., a processor, and ASIC, etc.) for providing functionality that may relate to exploiting DRx/CDRx parameters in such a way that a need for measurement gaps can be substantially reduced or eliminated and power usage may be conserved during an OTDOA session at apparatus 802.

The apparatuses 802, 804, and 806 include memory components 838, 840, and 842 (e.g., each including a memory device), respectively, for maintaining information (e.g., information indicative of reserved resources, thresholds, parameters, and so on). In addition, the apparatuses 802, 804, and 806 may include user interface devices 844, 846, and 848, respectively, for providing indications (e.g., audible and/or visual indications) to a user and/or for receiving user input (e.g., upon user actuation of a sensing device such a keypad, a touch screen, a microphone, and so on).

For convenience, the apparatuses 802, 804, and/or 806 are shown in FIG. 8 as including various components that may be configured according to the various examples described herein. It will be appreciated, however, that the illustrated blocks may have different functionality in different designs.

The components of FIG. 8 may be implemented in various ways. In some implementations, the components of FIG. 8 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 808, 832, 838, and 844 may be implemented by processor and memory component(s) of the apparatus 802 (e.g., by execution of appropriate code and/or by appropriate configuration of processor components). Similarly, some or all of the functionality represented by blocks 814, 820, 834, 840, and 846 may be implemented by processor and memory component(s) of the apparatus 804 (e.g., by execution of appropriate code and/or by appropriate configuration of processor components). Also, some or all of the functionality represented by blocks 826, 836, 842, and 848 may be implemented by processor and memory component(s) of the apparatus 806 (e.g., by execution of appropriate code and/or appropriate processor configuration).

In an aspect, the apparatus 804 may correspond to an eNodeB. The apparatus 802 may transmit and receive messages via a wireless link 860 with the apparatus 804, the messages including information related to various types of communication (e.g., voice, data, multimedia services, associated control signaling, reference signals, etc.). The wireless link 860 may operate over a communication medium of interest, shown by way of example in FIG. 8 as the medium 862, which may be shared with other communications as well as other RATs. A medium of this type may be composed of one or more frequency, time, and/or space communication resources (e.g., encompassing one or more channels across one or more carriers) associated with communication between one or more transmitter and receiver pairs, such as the apparatus 804 and the apparatus 802 for the medium 862.

As a particular example, the medium 862 may correspond to at least a portion of a licensed frequency band. In general, the apparatus 802 and the apparatus 804 may operate via the wireless link 860 according to one or more radio access types, such as LTE or Fifth Generation (5G) New Radio (NR), depending on the network in which they are deployed. These networks may include, for example, different variants of CDMA networks (e.g., LTE networks), Time Division Multiple Access (TDMA) networks, Frequency Division Multiple Access (FDMA) networks, Orthogonal FDMA (OFDMA) networks, Single-Carrier FDMA (SC-FDMA) networks, and so on.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects and embodiments described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or other such configurations).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in an IoT device. In the alternative, the processor and the non-transitory computer-readable medium may be discrete components in a user terminal.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects and embodiments, those skilled in the art will appreciate that various changes and modifications could be made herein without departing from the scope of the disclosure as defined by the appended claims. Furthermore, in accordance with the various illustrative aspects and embodiments described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A method for exploiting discontinuous reception (DRx) parameters to conserve power during an Observed Time Difference of Arrival (OTDOA) measurement session, comprising:
receiving, at a network server, information related to a DRx configuration associated with a user equipment (UE);
selecting, at the network server, one or more inter-frequency base stations having inter-frequency Positioning Reference Signals (PRS) occasions that coincide with an OFF duration of the DRx configuration associated with the UE; and
transmitting, by the network server to the UE, OTDOA assistance data that includes information related to the inter-frequency PRS occasions that coincide with the OFF duration of the DRx configuration associated with the UE.

2. The method recited in claim 1, wherein the network server receives the information related to the DRx configuration associated with the UE from the UE.

3. The method recited in claim 1, wherein the network server receives the information related to the DRx configuration associated with the UE from one or more of a base station or a Mobility Management Entity (MME) serving the UE.

4. The method recited in claim 1, wherein the DRx configuration comprises a Connected Mode DRx (CDRx) configuration.

5. The method recited in claim 1, wherein the DRx configuration includes one or more cell-specific parameters configured at a base station serving the UE.

6. The method recited in claim 1, wherein the DRx configuration includes one or more UE-specific parameters configured at a Mobility Management Entity (MME) serving the UE.

7. The method recited in claim 1, wherein the one or more inter-frequency base stations include multiple base stations that have inter-frequency PRS occasions that at least partially coincide with the OFF duration of the DRx configuration associated with the UE.

8. The method recited in claim 7, further comprising:
generating a list that orders the multiple base stations according to a priority based at least in part on an extent to which the inter-frequency PRS occasions align with the OFF duration of the DRx configuration associated with the UE, wherein the OTDOA assistance data transmitted to the UE includes the generated list.

9. An apparatus, comprising:
a receiver configured to receive information related to a discontinuous reception (DRx) configuration associated with a user equipment (UE);
at least one processor configured to select one or more inter-frequency base stations having inter-frequency Positioning Reference Signals (PRS) occasions that coincide with an OFF duration of the DRx configuration associated with the UE; and
a transmitter configured to transmit, to the UE, Observed Time Difference of Arrival (OTDOA) assistance data that includes information related to the inter-frequency PRS occasions that coincide with the OFF duration of the DRx configuration associated with the UE.

10. The apparatus recited in claim 9, wherein the information related to the DRx configuration associated with the UE is received from the UE.

11. The apparatus recited in claim 9, wherein the information related to the DRx configuration associated with the UE is received from one or more of a base station or a Mobility Management Entity (MME) serving the UE.

12. The apparatus recited in claim 9, wherein the DRx configuration comprises a Connected Mode DRx (CDRx) configuration.

13. The apparatus recited in claim 9, wherein the DRx configuration includes one or more cell-specific parameters configured at a base station serving the UE.

14. The apparatus recited in claim 9, wherein the DRx configuration includes one or more UE-specific parameters configured at a Mobility Management Entity (MME) serving the UE.

15. The apparatus recited in claim 9, wherein the one or more inter-frequency base stations include multiple base stations that have inter-frequency PRS occasions that at least partially coincide with the OFF duration of the DRx configuration associated with the UE.

16. The apparatus recited in claim 15, wherein the at least one processor is further configured to generate a list in which the multiple base stations are ordered according to a priority based at least in part on an extent to which the inter-frequency PRS occasions align with the OFF duration of the DRx configuration associated with the UE, wherein the OTDOA assistance data transmitted to the UE includes the generated list.

17. A method for exploiting discontinuous reception (DRx) parameters to conserve power during an Observed Time Difference of Arrival (OTDOA) measurement session, comprising:
   receiving, at a network device serving a user equipment (UE), information related to OTDOA assistance data provided to the UE, wherein the information related to the OTDOA assistance data provided to the UE includes timing associated with one or more inter-frequency Positioning Reference Signals (PRS) occasions;
   selecting, at the network device, a DRx configuration in which an OFF duration at least partially coincides with the timing associated with the one or more inter-frequency PRS occasions indicated in the OTDOA assistance data; and
   transmitting, by the network device, one or more parameters related to the selected DRx configuration to the UE such that the one or more inter-frequency PRS occasions are measured during the OFF duration of the DRx configuration.

18. The method recited in claim 17, wherein the network device receives the information related to the OTDOA assistance data from the UE.

19. The method recited in claim 17, wherein the network device receives the information related to the OTDOA assistance data from one or more of a Location Server (LS) or a Position Determining Entity (PDE) that provided the OTDOA assistance data to the UE.

20. The method recited in claim 17, wherein the selected DRx configuration comprises a Connected Mode DRx (CDRx) configuration.

21. The method recited in claim 17, wherein the network device is a base station serving the UE and the one or more parameters related to the selected DRx configuration are cell-specific parameters broadcasted to all UEs served by the base station.

22. The method recited in claim 17, wherein the network device is a Mobility Management Entity (MME) serving the UE and the one or more parameters related to the selected DRx configuration are UE-specific parameters provided to the UE via non-access stratum (NAS) signaling.

23. The method recited in claim 17, wherein the DRx configuration is selected to maximize an extent to which the one or more inter-frequency PRS occasions align with the OFF duration of the DRx configuration.

24. An apparatus, comprising:
   a receiver configured to receive information related to Observed Time Difference of Arrival (OTDOA) assistance data provided to a user equipment (UE) served by the apparatus, wherein the information related to the OTDOA assistance data provided to the UE includes timing associated with one or more inter-frequency Positioning Reference Signals (PRS) occasions;
   at least one processor configured to select a discontinuous reception (DRx) configuration in which an OFF duration at least partially coincides with the timing associated with the one or more inter-frequency PRS occasions indicated in the OTDOA assistance data; and
   a transmitter configured to transmit one or more parameters related to the selected DRx configuration to the UE such that the UE is configured to measure the one or more inter-frequency PRS occasions during the OFF duration of the DRx configuration.

25. The apparatus recited in claim 24, wherein the information related to the OTDOA assistance data is received from the UE.

26. The apparatus recited in claim 24, wherein the information related to the OTDOA assistance data is received from one or more of a Location Server (LS) or a Position Determining Entity (PDE) that provided the OTDOA assistance data to the UE.

27. The apparatus recited in claim 24, wherein the selected DRx configuration comprises a Connected Mode DRx (CDRx) configuration.

28. The apparatus recited in claim 24, wherein the one or more parameters related to the selected DRx configuration are cell-specific parameters broadcasted to all UEs served by the apparatus.

29. The apparatus recited in claim 24, wherein the one or more parameters related to the selected DRx configuration are UE-specific parameters that are transmitted to the UE via non-access stratum (NAS) signaling.

30. The apparatus recited in claim 24, wherein the at least one processor is configured to select the DRx configuration to maximize an extent to which the one or more inter-frequency PRS occasions align with the OFF duration of the DRx configuration.

* * * * *